Aug. 15, 1933.   E. H. CAIN   1,922,792
TESTING APPARATUS
Filed March 30, 1932   4 Sheets-Sheet 1

INVENTOR.
Edward H. Cain
BY
Geo. B. Pitts
ATTORNEY.

Aug. 15, 1933.   E. H. CAIN   1,922,792
TESTING APPARATUS
Filed March 30, 1932   4 Sheets-Sheet 2

INVENTOR.
Edward H. Cain
BY
ATTORNEY.

INVENTOR.
Edward H. Cain
BY Geo. B Pitts
ATTORNEY.

Aug. 15, 1933.   E. H. CAIN   1,922,792
TESTING APPARATUS
Filed March 30, 1932    4 Sheets-Sheet 4

INVENTOR.
Edward H. Cain
BY Geo. B. Pitts
ATTORNEY.

Patented Aug. 15, 1933

1,922,792

UNITED STATES PATENT OFFICE 1,922,792

TESTING APPARATUS

Edward H. Cain, South Euclid, Ohio

Application March 30, 1932. Serial No. 602,027

15 Claims. (Cl. 175—183)

This invention relates to apparatus for testing one or more electrical units of the character that require a period of time to elapse before a correct meter reading or accurate testing can be determined. One application of my invention consists in testing storage batteries used for various purposes such for example, batteries for use in automobiles. When the cells of a storage battery are connected to voltmeters to determine their respective voltages, they, in most instances, contain what is called surface charges, and accordingly these charges effect readings on the meters higher than the true E. M. F. of the cells as would occur if the battery was subjected to a predetermined load for a predetermined time, as determined by the battery manufacturer's rating or specification; but if the cells remain connected with the voltmeters and under said specified load for a period of time approximating 30 seconds, these surface charges will become discharged, neutralized or dissipated, and the voltmeters will then show accurately the true E. M. F.'s of the battery cells which is a true indication of their internal condition and tells whether one or more cells are defective or at fault.

Much difficulty has occurred in the past for the reason that in making a battery test, the mechanic, through inexperience or carelessness, has noted the readings of the voltmeters immediately the cells were connected thereto and because of the surface charges present in the battery, the mechanic has made a favorable, but incorrect, report on the condition of the battery tested. If such battery was put back into service, its deficiency would re-appear as soon as the surface charges were used up; or if such battery was placed "on charge" and it contained a defective or faulty cell, the re-charging operation would be ineffective. Both instances have caused much trouble, delay and expense to the battery owner and battery station operator.

My invention has for its primary object to construct an improved apparatus in which provision is made to prevent the mechanic or tester from obtaining a reading of a meter or meters in testing electrical apparatus until after the elapse of a predetermined time period.

Another object of the invention is to construct an improved apparatus for testing batteries in which provision is made to prevent readings of the voltmeters until a predetermined time interval has elapsed.

Another object of the invention is to provide an improved electrical testing apparatus having a time operating element controlling the meter reading, whereby a correct test of an electrical unit is automatically effected.

Another object of the invention is to provide a testing apparatus comprising circuits arranged to connect a load and a meter or meters to the unit to be tested and magnetically operated switches for said circuits and one or more time operating switches to effect reading of the meter or meters at the end of a predetermined period and opening of the circuit to the load at the end of a second predetermined period.

Another object of the invention is to provide an improved electrical testing apparatus having related circuits between the meter or meters and the unit to be tested and a time switch to control the circuits in a predetermined order, whereby reading of the meter or meters can only be made at the end of a predetermined period.

Another object of the invention is to construct an improved battery testing apparatus having a main circuit and a secondary circuit automatically controlled by related time switches, and operable to make the meters effective or readable only after the elapse of a predetermined time period.

Another object of the invention is to provide an improved battery testing apparatus employing a fixed or definite load for a predetermined time interval, capable of definitely showing the correct E. M. F. of the battery cells, whereby, upon determining the specific gravity of the cells and comparing such gravity test readings and meter readings with predetermined standardized charts showing the correct readings, respectively, the true relationship between the E. M. F. and specific gravity of the respective cells can be determined.

A further object of the invention is to provide an improved apparatus of this character which may be readily assembled and easily operated.

Other objects of the invention will be apparent to those skilled in the art to which my invention relates from the following description taken in connection with the accompanying drawings, wherein

Figs. 11, 12 and 13 are fragmentary views showing different forms of voltmeters which may be used in connection with either embodiment of the invention shown in Figs. 4 and 4a.

Figure 1:
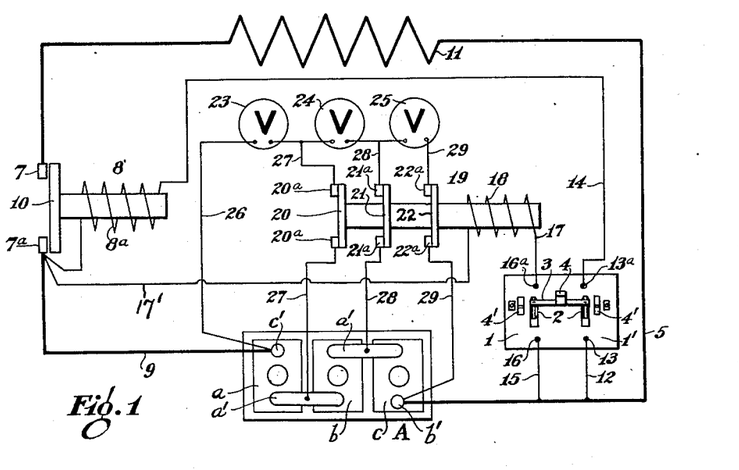
Fig. 1 is a diagrammatic view of an apparatus embodying my invention; a battery being shown connected in the circuits for testing.

In the drawings, A indicates a battery having cells $a$, $b$ and $c$ to be tested, connected by the bus bars $a'$ and terminals $b'$, $c'$. 1, 1', indicate as entireties two time switches each having an operating shank or lever 2, these levers being connected together by bar 3 having a handle 4, whereby both switches are closed simultaneously, but the movable contacts thereof open independently, as will later appear. In the preferred arrangement, one switch operates to open one circuit at the end of a predetermined period (for example, at the end of thirty seconds) and the other switch operates to open the other circuit at the end of a predetermined period (for example, at the end of sixty seconds). In the form of construction disclosed, either or both periods may be lengthened or shortened by operating the switches to closed and open position successively, such operation in the disclosed construction serving to wind up the time controlled mechanism dependent upon the length of the period desired. However, since the shanks 2 are connected together, if the time period of one switch relative to other switch is to be changed, it will be necessary to disconnect the shanks from each other and operate one as above described, independently of the other. In the preferred adjustment when the handle 4 is operated downwardly and back to its initial position, the switch 1 automatically opens in 30 seconds, and the switch 1' automatically opens at the end of a second 30-second period.

The switches 1, 1', and the circuits and other parts hereinafter referred to may be mounted on a suitable panel B (see Figs. 11, 12 and 13) and such panel may include a support for the battery A while it is being tested.

5 indicates a lead adapted to be connected at one end to the battery terminal $b'$. The other end of the lead is connected to one contact 7 of a magnetic switch 8, the other contact 7a of the switch being adapted to be connected by a lead 9 to the other battery terminal $c'$. The circuit across the contacts 7, 7a, is closed by the bridge member 10 when the winding 8a of the switch 8 is energized. The bridge member is normally held out of engagement with the contacts 7, 7a, by a spring (not shown), but is moved into engagement therewith when the winding 8a is energized. 11 is a resistance in the lead 5 (preferably a fixed resistance) to provide a load on the battery, while test is being made. 12 indicates a lead connecting the terminal 13 of the switch 1' to the lead 5. 14 indicates a lead connecting the other terminal 13a of the switch 1' to one end of the winding 8a, the other end of the winding being connected to the lead 9 (such connection being preferably through the contact 7a).

15 indicates a lead connecting the terminal 16 of the switch 1 to the lead 5. 17 is a lead connected to the other terminal 16a of the switch 1 to one end of a winding 18 of a magnetic switch 19. 17' indicates a lead connecting the other end of the winding 18 to lead 9 (such connection being preferably through the contact 7a). The switch 19 is provided with three bridge members 20, 21, 22, adapted to open or close the circuits across pairs of contacts 20a—20a, 21a—21a and 22a—22a, respectively, in the manner hereinafter set forth. The bridge members 20, 21 and 22 are normally held in engagement with the pairs of contacts by a spring (not shown) acting on the core but are moved out of engagement therewith when the winding 18 is energized. The voltmeters 23, 24, 25, are adapted to be connected to the cells $a$, $b$, $c$, respectively by leads 26, 27, 28 and 29, the pairs of contacts 20a—20a, 21a—21a, 22a—22a of the switch 19 being interposed in the leads 27, 28 and 29, respectively.

The leads 5 and 29 may be connected to a suitable clip and the leads 9 and 26 may be connected to a suitable clip and the clips in turn may be detachably connected to the terminals $b'$, $c'$; likewise, the leads 27 and 28 are provided with suitable clips which permit them to be detachably connected to the bus bars $a'$.

Fig. 1 shows the position of the switches 8, 19, with the battery cells connected to the circuits before the switches 1, 1', are closed. If the switches 1, 1', are now closed, the windings 18, 8a, will be energized and effect operation of the switches 19 and 8, that is, the bridge member 10 will close the circuit across the contacts 7, 7a, thereby connecting the resistance in circuit with the battery, and the bridge members 20, 21, 22, will be moved out of engagement with the respective adjacent pairs of contacts. In this position of the magnetic switch 19, the voltmeters 23, 24, 25, will be disconnected from the battery cells $a$, $b$, $c$, and no voltage readings will appear on their dials. At the end of approximately a 30-second period, switch 1 will automatically open and break the circuit across terminals 16, 16a, thereby de-energizing the coil 18 and permitting the bridge members 20, 21, 22 to close the circuits across contacts 20a—20a, 21a—21a, 22a—22a, thereby connecting the cells $a$, $b$, $c$, to the voltmeters, so that readings thereof may be obtained.

It will thus be seen that during the 30-second period, any surface charge on the cells $a$, $b$, $c$, will be discharged, so that upon the closing of the circuits between them and the voltmeters 23, 24, 25, the latter will indicate the correct E. M. F.'s of the battery cells. At the end of approximately a 60-second period (that is, 30 seconds after switch 1 has automatically opened) the switch 1' will automatically open and break the circuit across the terminals 13, 13a, the effect of which is to de-energize the winding 8a and permit the bridge member 10 to disengage the contacts 7, 7a.

The time switches 1, 1', may be of any desired construction but those chosen for illustration are similar to the one shown and described in Letters Patent No. 1,795,969, dated March 10, 1931, and issued to Marcus H. Rhodes. The construction of each of the switches is shown in Figs. 5 to 10, inclusive, to which reference is now made, as follows: 30 is a cover plate fastened to a lower U-shaped plate 31. The cover plate 30 is provided with openings, one for accommodating an oscillatory timing control handle or lever 4' and the other for accommodating the adjacent switching or circuit control lever 2, both levers extending outwardly through the openings from the inside of the switch. The function of the switching lever 2 is to set the mechanism hereinafter referred to for operation, whereby such mechanism at the end of the 30-second or 60-second period will break the circuit. The lever 2 may also be manipulated or actuated for varying the time of current flow after the switch lever 2 has been set to "off" position, as above set forth, and the purpose of the time lever 4' is to set the switch either for timed or non-timed operation. The cover is provided another opening for displaying one portion of the periphery of a time indicator wheel 35, also located within the switch.

However, since the circuits described are to operate at the end of definite periods, the levers 4' can be left in their "on" positions and the timing mechanism set so that the single operation of the lever 4 to "on" position and then to "off" position, will cause the operation of both switches, as above described.

A box 32 forms an insulating housing for the switch parts. The terminals 13, 13a, or 16, 16a, are supported therein, said terminals carrying contact screws 50 for fastening the line wires 12, 14 or 15, 17, thereto. Stationary knife blade extensions 59 and 60 extend from the terminals, respectively, for engagement by and with pairs of spring contactors or terminal engaging elements 34, said contactors 34 being formed with a connecting bar 61, the latter being pivoted on a pin 35. The pin 35 is fastened in the switch box.

Figure 6:
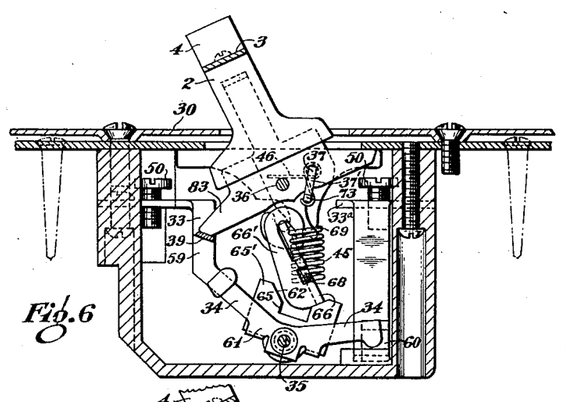
Figure 7:
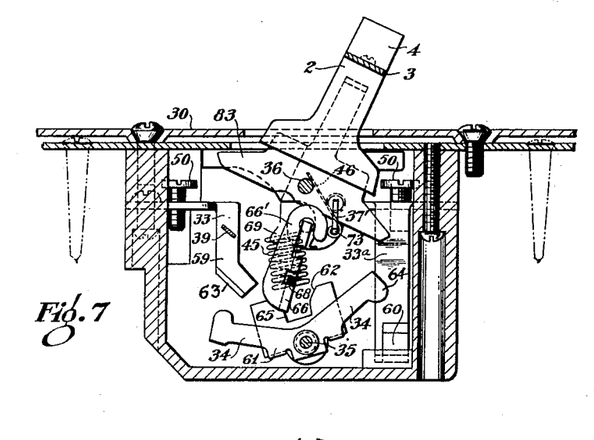

It will be recognized that when the contactor 34—34 is in the position shown in Fig. 6 that it is in circuit closing position with respect to the switch terminals. When the contactor is moved to the left (Fig. 7) the circuit is open, because the contactors 34 disengage from the blades 59, 60. In order to facilitate contacting, the extensions 59, 60 are somewhat sharpened, as indicated at 63, for ready engagement with flared ears 64 of the pairs of spring contactors 34. Operation of the contactors 34 is effected by forming an opening 65, in a block 65'. The block 65' is fastened to the contactor part 34. Coordinating with and within this opening 65 is a depending tongue 66 of a switch hammer 66', said hammer being adapted to swing on gudgeons. It will be noted that the switch hammer can swing freely through a substantial arc before striking the sides of the opening 65, thus providing a lost-motion engagement. Inspection of Figs. 6 and 7 shows how the upper corners of the opening 65 are relieved, as indicated at numeral 62 for the purpose of permitting some continued movement of the switch hammer after it has opened and closed the switch. This function so places the switch hammer that the switch blade itself is locked in either its open or closed position.

The switch hammer 66' is provided with a spring-seating extension 68 for receiving a switch spring 45. The spring 45 extends upwardly and seats against the lower end 69 of the switch lever 2, the latter being swung on a switch lever pin 36 fastened between the sides of the U-plate 31. It will be seen thus far that the switch hammer 66', switch lever 2 and reacting switch spring 45 form an over-centering, toggle linkage. The action of this linkage is such that when the upper reaction point of the spring at the end 69 crosses the center line CL of the switch hammer, for instance, to the right, then the spring is put under compression and tends to throw the switch hammer to the left, provided there is no other mechanism to prevent it. For example, in Fig. 6 the spring is in compressed reacting position for throwing the switch hammer sharply in a clockwise direction to the left, whereupon the tongue 66 will gain momentum in passing through its lost-motion path in the opening 65. Then the tongue 66 will strike the left hand end of the opening 65 with a sharp blow and instantly throw the contactors 34 out of engagement with the extension of the poles or terminals. It should however, be noted that another part of the mechanism, which will be described, normally prevents this action from the Fig. 6 position until a predetermined release is effected.

Continuing the reference to the toggle action, it will be seen that if the switch lever is thrown to its opposite, right hand extreme (Fig. 7), then the upper point will pass over said center line CL. This passage over the center line throws the spring reaction into an overcentering relationship, such that the switch hammer is suddenly forced to assume a counter-clockwise movement. The tongue 66 travels with loss of motion in the reverse direction through the opening 65 and strikes the right hand thereof with a sudden blow, thereby quickly snapping the switch shut, the contactors 34 moving to the right into engagement with extensions of the switch terminals. It is to be noted that when the switch lever 2 is thrown for closing the switch, that the switch closes immediately, there being no delaying action in the mechanism such as will be explained in connection with opening the switch from the closed position.

As stated above, it will be noted that Fig. 6 shows the toggle linkage in such position that the spring is compressed and over-centered and ready to throw the switch hammer so as to open the switch, but there is a temporary mechanical restraint which will now be described.

The box 32 is divided into two compartments by a plate 70, one compartment containing the parts above described and the compartments containing certain of the parts hereafter referred to. An arcuate opening 71 in the wall 70 of the U-plate 31 accommodates an extension ear 72 of the switch hammer 66. The function of this extension is to be held and released for time delaying purposes. The coordinating latching apparatus therefor will be described hereinafter.

Figure 2:
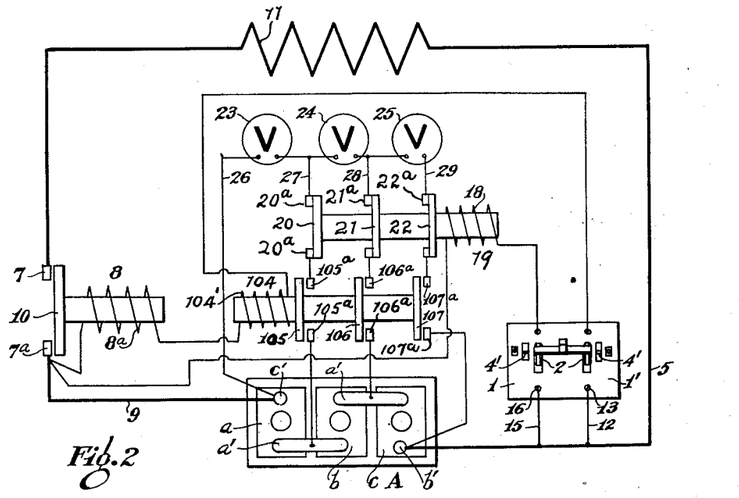
Fig. 2 is a view similar to Fig. 1, but embodying a slight modification.

Pivoted to the switch lever 2 by means of an arm 37 is a pawl 37' which has an ear 73 provided for fastening a pawl spring 46 which spring reacts from the switch pin 36 to hold an oppositely extending ear 74 (Fig. 8) in engagement with the teeth of a ratchet wheel 74'. The ear 74, which reaches through an opening 71a in the plate 70, is pressed into engagement with the teeth of said ratchet 74' whenever the lever 2 is thrown into its "on" position and in the "off" position of the lever 2 said pawl ear 74 is drawn up against the side of the opening 71a (as illustrated in Fig. 2) so as to permit clearing of the ratchet teeth by the ear 74 when it is desired to return the ratchet teeth according to the functions hereinafter set out. As will be made clear, the advance of the ratchet is one tooth every time the switch lever is thrown to "on" position. In other words, when the lever 2 moves from "off" to "on" position, the pawl 74 rides down the left face of the opening 71a and engages a tooth such as X (Fig. 2) for advancement through an arc corresponding to the arc occupied by one ratchet tooth. The switch lever may be serially or repeatedly operated to advance the ratchet step by step.

The ratchet 74' (Figs. 7 and 9) is integrally moveable with a main spring hub 74a and also with a main spring pawl wheel 74b so that the ratchet 74', hub 74a and main spring pawl 74b may turn together. On the other hand, there is provided a main gear wheel 74c which is relatively rotatable with respect to said parts 74b, 74', 74a.

The gear 74c is provided with openings which are matched by detents of pawl 74b, a plurality of which detents are used. The detents are formed in such a direction and engage said gear openings in such a manner that when the operation of lever 2 results in movement of the ratchet 74', return of said ratchet under action of spring 44 is prevented by the engagement of the detents with certain of the gear wheel openings. The gear wheel resists return action of the ratchet 74' caused by the initially provided tension in the main spring 44, because the gear train, into which it is connected, is at this time locked against movement.

Figure 9:
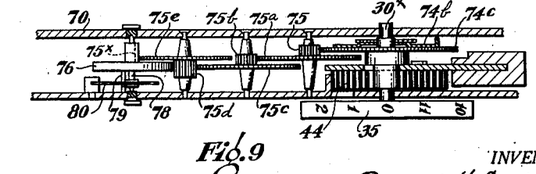
Figure 10:
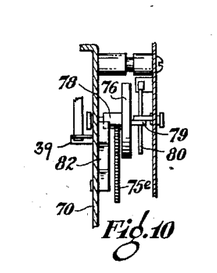

The timing gear train referred to above is shown more particularly in Fig. 9 where the gear 74c is shown as meshing with a pinion 75. Said pinion 75 is integrally rotatable with a gear 75a which meshes with a second pinion 75b. A second gear wheel 75c is integrally movable with the pinion 75b and meshes with a third pinion 75d the latter being made fast with a third gear wheel 75e. This last wheel has its teeth so cut that it comprises an escape wheel which meshes with a slotted portion 75x of a balance staff 78. The staff 75x is integrally movable with balance wheel 76. Vibration of the balance wheel is effected by means of a hair spring 80. A balance wheel stop pin 79 permits the escapement wheel 75e to drive the balance wheel only a predetermined distance. The action is such that as the escapement wheel 75e delivers energy to the balance staff 78 one tooth of the same fits into the groove 75x and revolves the balance staff 78. The hair spring 80 attached to the shaft is flexed by this rotation. At a predetermined point in the rotation of the staff 78 the said tooth of the wheel 75e slips out of the slot 75x. The hair spring 80 then reverses the rotation of the staff 78. Instantly the second or next tooth on the gear 75e strikes against the smooth side of the balance staff 78 and remains at a pressure position until the hair spring again rotates the balanced staff 78 back to a position where the second or next tooth is permitted to drop into the slot and ride by as the slot returns to repeat the cycle.

It will be apparent from the above that the escapement will permit the gear train to run down under action of the main spring 44 only at a predetermined rate. It has also been made clear above that when the switch handle 4 is operated to its "on" position that the ratchet 74' is picked up by the pawl 74 to be moved through the angle subtended by one pawl tooth. This means that the main spring pawl 74b is moved the same angle and it is desirable at this time that the gear train be locked. In order to accomplish locking or braking there is held near the escapement a flexor 82 which is normally pressed into engagement with the staff 78. Thus the staff 78 is locked, this also locking the gear trains.

It is clear that under these conditions the ratchet 74' can be operated with the main spring pawl 74b without effecting gear train movement, that is to say, the lever 4 may be thrown from "off" to "on" position without effecting gear train movement, the pawl piece 74b ratcheting in the openings 76 of the main gear 74c.

Figure 8:
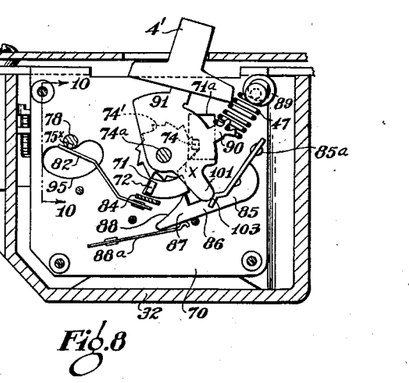

On the other hand, when the switch handle 4 is thrown from "on" to "off" position it is desirable, for reasons already stated, that the escapement be released so that the gear train may run down a predetermined amount. In order to accomplish this, there is provided a leg 39 (see Fig. 6) of said flexor 82 (Fig. 8) which is adapted to be engaged by an extending portion 83 on the switch handle which depresses the flexor 82 to a position in which it is spaced from the staff 78. In this position no braking action is effected and the gear train is released for action. Under these conditions the escapement may vibrate and permit the gear train to run down. Thus the flexor acts to prevent the escapement from operating until the switch lever has been returned to rest at its "off" position. Otherwise the escapement would operate to permit running down of the time delay mechanism while the switch lever rested at the "on" position. Fig. 8 shows how the flexor is provided with an offset 39 reaching through an opening 95 (Fig. 7) in the plate 70 for reacting contact with the switch lever 2.

The ratchet 74' has ten thirty degree teeth and one sixty degree tooth. The gear 74c has 12 openings corresponding to twelve angular divisions, so that each time a single movement from "off" to "on" of the switch handle 4 is effected, there will be normally an advance of thirty degrees of the ratchet and main spring pawl 74b, the pawl during advance strokes moving its detents from one opening to the next successive opening in gear 74c. The gear at this time does not move for the reasons given above.

The main spring pawl 74b is also provided with a lug 84, which as the switch handle 4 is moved to "on" position is retracted in a clockwise direction (Figs. 5 and 8) through a thirty degree arc for every "on" movement of the handle 4. If the handle is moved to "on" position once, then a thirty degree retraction is effected and if it is moved twice a sixty degree retraction is made and so on. The purpose of the lug 84 is to serve as a release for latching parts.

Said mechanism comprises a latch cam 85 pivoted at 85a. This cam has an extension 86 (Fig. 8) having a claw 87 which is adapted to hook in under the ear 72 when said ear, by actuation of the switch lever 4 to its "off" position, is thrown into its Fig. 5 position. A sloping face 88 on the claw permits the ear 72 to thrust it aside against the reaction of a leaf spring 88a.

A time lever spring 47 reaches from a lug 89 to one arm 90 of a bell crank lever 91 connected to the time lever 4' extending to the outside of the switch. The reaction points of the time lever spring 47 are so arranged that when the time lever 4' is thrown to its extreme positions, "on" and "off", there is an over-centering action, one way or the other.

There is provided on the bell crank 91 a second extension 101 adapted to engage with an extension lug 103 located on said latch cam 85. This cooperation takes place against the action of said spring 88 at the time when the bell crank lever 91 is in its Fig. 8 position, that is, in its "off" position, and the latch cam 85 is prevented from cooperating with the lug or ear 72.

When the time lever 4' is in its "on" position (Fig. 5) the latch cam 85 is ready to lock the ear 72 back, whenever the switch lever 4 is thrown into "on" position to throw the hammer 66' to the right as shown in Fig. 6. Whenever the time lever is in its "off" position there will be no latching (locking) action by the latch cam, and throwing of the switch lever 4 from "on" to "off" position results in immediately breaking the circuit instead of a delayed breaking being effected. It will be noted that the bell crank lever 91 for the time lever 4' is rotatably mounted on the hub member 30.

A feature of the sloping face 88 of the latch cam 85 is that it is adapted to be engaged by the ear 84 or the main spring pawl 74b as said pawl returns under action of the main spring 44 used in driving the gear train, said train being controlled by the escapement. It will be noted that all increments of time added by throwing the switch lever 4 are equal, that is subsequently to the first switch lever throw. That is to say, the pawl 74b moves through equal distances from its retracted position, and opening action of the switch (as the timing train runs down) is delayed proportionally to the time that it takes the pawl 74b to reach the latch cam 85. If it is desired to set the switches for longer times, then the switch lever 4 must be operated two or more times and a proportionately longer time delay will be effected.

In Fig. 8, is will be noted, that one of the teeth of the ratchet subtends twice the amount of arc that the others do. The reason for this is that if the switch handle 4 is operated eleven times to set the switch for maximum time delay, it is undesirable that an operator be permitted to continue abnormally winding up the device by operating the switch handle 4. The long tooth Y prevents this, because the actuating stroke of the lug 74 is not great enough to catch back on the next tooth. Thus, the device is foolproof.

From the foregoing description it will be seen that I provide a pair of switches each of which switches may serve as an ordinary snap on and off switch or as a time switch, simply by the operation of the lever or handles 4', but in connection with the circuits and magnetic switches constituting my invention, the handles 4' are moved to their "on" positions so that the switches 1, 1', when operated, may open at the respective time intervals above set forth.

It will be noted that in the Fig. 1 form of construction the supplemental magnetic switch 19 is normally closed so that when the leads are connected to the battery terminals and buss bars (before the switches 1, 1', are operated), the meter hands may move beyond the meter limits and danger of bending the hands results. To overcome such difficulty, I may, as shown in Fig. 2, provide in the circuit or circuits connecting the unit or units to be tested with the meter or meters an auxiliary magnetic switch 104 having members 105, 106, 107, for bridging pairs of contacts 105a, 106a, 107a, interposed in the leads 27, 28 and 29, respectively. The winding 104' for switch 104 is connected in series with the winding 8a, in the main control circuit, the switch 104 being normally open, so that when the battery is connected in the circuits, the voltmeters will show no readings, but upon operation of the switches 1, 1', the windings for the switch 8, 19 and 104 will be energized, thereby closing the load circuit to the battery, closing the circuits across the pairs of contacts 105a, 106a, 107a, and opening the circuits across the pairs of contacts 20a, 21a, 22a. Accordingly, at the end of the first 30-second period, the switch 1 will automatically open and permit the switch 19 to close the circuits across the latter pairs of contacts so that the meter readings can be made. At the end of the second 30-second period the switch 1' will automatically open and break the circuit across the contacts 7, 7a.

Figure 3:
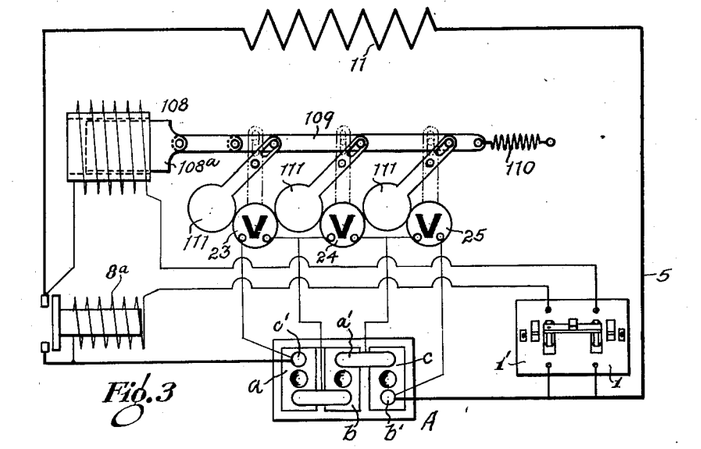
Fig. 3 is a diagrammatic view of an apparatus embodying my invention but in which the controlled circuits actuate shutters after the elapse of a predetermined period to permit readings of the voltmeters.

Fig. 3 shows a form of construction having shutters which close the dials for the meters 23, 24, 25 from view but which at the end of 30 seconds move away from the dials to permit reading thereof. In this form of construction, in lieu of the supplemental magnetic switch in the supplemental circuit I provide a solenoid 108, the core 108a of which is connected to a rod or link 109 slidably supported in a suitable manner upon the panel and moved in one direction by a spring 110 and moved in the opposite direction by the solenoid when the winding thereof is energized. 111 indicates shutters suitably pivoted on the panel and operatively connected to the rod 109. The shutters 111 are shown in position in Fig. 3, that is their position prior to the operation of the switches 1, 1', which in the diagram (Fig. 3) are reversed as compared to the arrangements shown in Figs. 1 and 2. Upon the operation of the switches 1, 1', the load circuit is closed and the solenoid operates to move the shutters 111 in front of the voltmeters 23, 24, 25, as shown in dotted lines; then at the end of 30 seconds switch 1 opens, which de-energizes the coil for the solenoid, whereupon the shutters move away from the voltmeters and permit reading thereof. And at the end of the second 30-second period, switch 1' opens and de-energizes the winding 8a thereby opening the load circuit.

Figure 4:
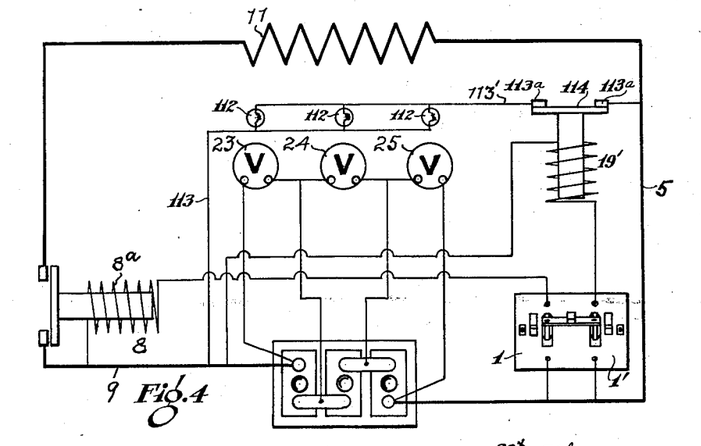
Fig. 4 is a diagrammatic view showing another embodiment of the invention.

Fig. 4 illustrates a modification of the invention in which the supplemental control circuit supplies current to lamps 112 (one for each meter) instead of opening and closing the circuits between the battery cells and the meters, the lamps being connected in parallel between leads 113 and 113' connected to the leads 9 and 5 respectively and having imposed in lead 113', contacts 113a bridged by the member 114 of the supplemental magnetic switch 19'. In this arrangement, operation of the switches 1, 1', will close the load circuit and open the circuit through the lamps 112. At the end of the first 30-second period, the switch 1' will operate and open the supplemental circuit, thereby de-energizing the coil of switch 19' thus permitting the lamp circuit to close across the contacts 113a. The meters can then be read and at the end of the second 30-second period, switch 1 will operate and open the load circuit. Leads 113 and 113' of the light circuit can be connected directly to the outside lighting circuit instead of the leads 9 and 5, if it is desired to overcome the difficulty encountered because the lights do not burn bright when a faulty battery is tested.

Figure 4A:
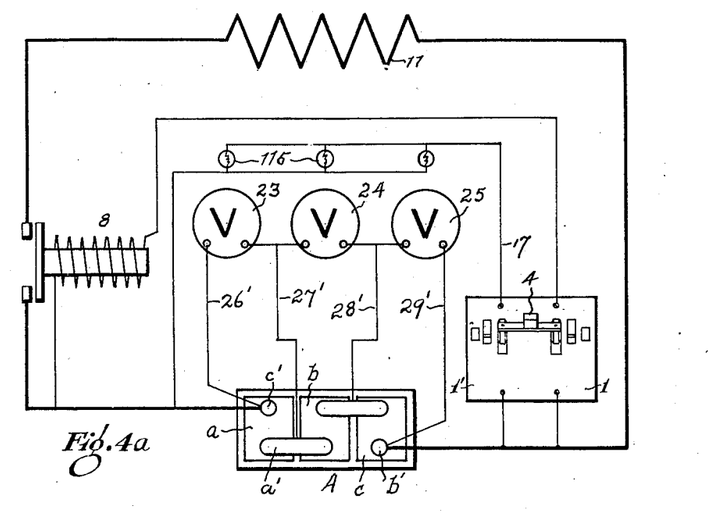
Fig. 4a is a diagrammatic view showing another embodiment of the invention.
Figure 5:
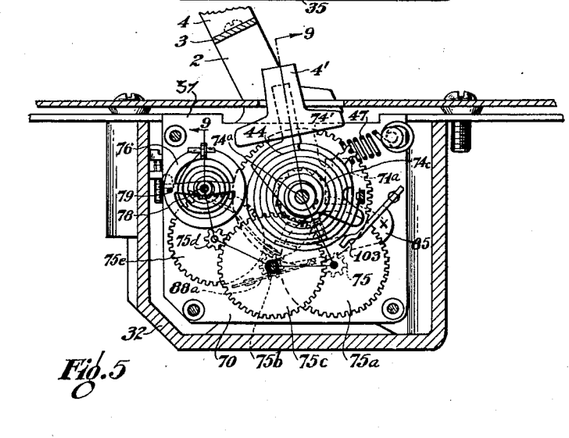
Figs. 5 to 10, inclusive, are sectional views illustrating the construction of each of the time switches.

Fig. 4a illustrates a further modified arrangement employing lamps for controlling the meter readings at the end of the first 30-second period, but in which the magnetic switch in the supplemental circuit is eliminated. In this arrangement, the voltmeters 23, 24 and 25 are connected to the battery cells a, b, c, by leads 26', 27', 28', 29'; also (a) the switch mechanisms for the switches 1, 1', are reversed with respect to each other, so that when the lever 4 is in its initial position, the circuit across the terminals for the switch 1 is open and the circuit across the terminals for the switch 1' is closed and (b) the lead 17 has interposed in it the lamps 115, one associated with each meter to light it up. Accordingly, after the battery is connected in the circuits and the lever or handle 4 is operated, the switch 1 will be closed, thereby energizing the coil of the magnetic switch 8 and connecting in the resistance or load 11 to the battery, and the supplemental circuit through the lamps 115 will be opened by switch 1', so that the meters cannot be read. At the end of the first 30-second period, switch 1' will close, thereby lighting the lamps 115 and permitting the meters to be read, and at the end of the second 30-second period, switch 1 will open, thereby breaking the load circuit.

Figure 11:
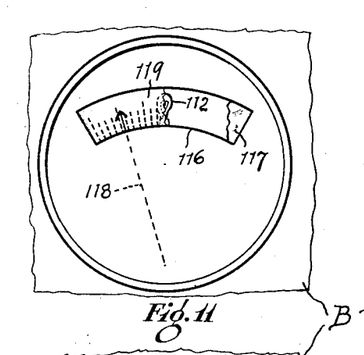
Figure 12:
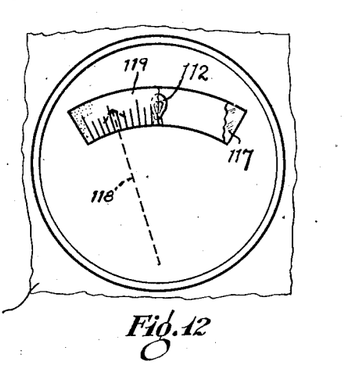
Figure 13:
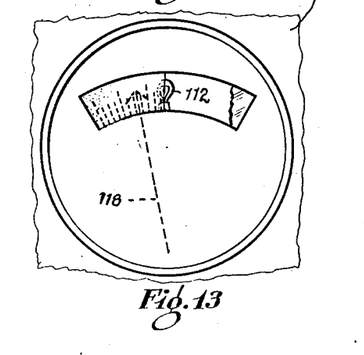

Figs. 11, 12 and 13 show constructions of voltmeters adapted to the arrangements shown in Figs. 4 and 4a, wherein the lighting of the lamps makes it possible to read the meters. If the lamps were placed adjacent the meter dials, it would be possible to read the latter at any time (or prematurely) and the lighting of the lamps would then serve as a signal to indicate that the time period (30 seconds) had expired; but to prevent such premature reading and thus insure reading only at the end of the 30-second period I prefer to make such readings invisible until the lamps are connected in the circuit and lighted. Referring to Fig. 11, the meter opening 116 is closed by a glass panel 117 behind which the meter hand 118 swings relative to a plate formed of semi-transparent material 119, the lamp 112 (or 115) being disposed on the rear side of the plate. The plate 119 is provided with calibrations (shown in dotted lines) on its inner face, but as the plate 119 is semi-transparent these calibrations are only visible when the lamp is lighted. Fig. 12 shows a construction in which the calibrations on the plate 119 are visible, but the meter hand 118 swings in a plane behind the plate 119 and in front of the lamp 112, so that the position of the hand relative to the calibrations is only visible when the lamp is lighted. Fig. 13 shows a construction in which the calibrations are arranged as in Fig. 11 and the hand 118 is mounted in the manner shown in Fig. 12, so that both the calibrations and hand are invisible until the lamp is lighted. Either form of voltmeter construction may be used.

Beside the advantage of securing by means of my apparatus correct meter readings to determine the true E. M. F. of the battery cells, my apparatus is advantageously used in connection with hydrometer tests for the cells, so that by comparison of such tests and the meter readings with a standardized chart showing the correct specific gravities for cells at different E. M. F., the mechanic or tester can determine the true relationship between the E. M. F. readings and specific gravities of the respective cells and thus condition the cells by the addition of sulphuric acid or the substitution of a portion thereof with water.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In an electric testing apparatus, the combination with a circuit having a meter connected therein and adapted to be connected to the unit to be tested, a separate circuit including a resistance adapted to be connected to the unit, a switch means having a timed actuating mechanism for controlling said separate circuit at the end of a predetermined period, means including a circuit for controlling the reading of said meter, a switch in the last mentioned circuit, and a timed actuated mechanism for operating said controlling means at the end of a predetermined period.

2. In an electric testing apparatus, the combination with a circuit having a meter connected therein and adapted to be connected to the unit to be tested, of a loaded circuit adapted to be connected to the unit to be tested, a normally closed magnetic switch for opening and closing said meter circuit, a separate circuit including the winding for said magnetic switch, a switch for closing said separate circuit, whereby the magnetic switch is operated to open said meter circuit, and a timed switch actuating mechanism arranged to open said last mentioned switch at the end of a predetermined interval, whereby said magnetic switch closes said meter circuit.

3. In an electric testing apparatus, the combination with a circuit having a meter connected therein and adapted to be connected to the unit to be tested, of a magnetic switch in said circuit and a circuit for said switch having a timed actuating mechanism arranged to control the operation thereof at the end of a predetermined period, a separate circuit including a resistance, and switch means for opening and closing said separate circuit and having a timed actuating mechanism arranged to operate at the end of a predetermined interval.

4. In an electric testing apparatus, the combination with a circuit having a meter connected therein and adapted to be connected to the terminals of a battery, of separate circuits adapted to be connected to the battery terminals, one of said separate circuits including a resistance and the other separate circuit including an electrical device arranged to make the reading of the meter effective, and switch means, one for each said separate circuit and one of said switch means including a time actuated mechanism, said switch means being set simultaneously but operable to control said circuits at the ends of different time periods.

5. In an electric testing apparatus, the combination with a circuit having a meter connected therein and adapted to be connected to the terminals of a battery to be tested, of a main circuit including a resistance adapted to be connected to said terminals, a control circuit including a magnetic switch adapted to be connected to said terminals, a switch means including a time actuated mechanism for said main circuit, and a switch means including a time actuated mechanism for said control circuit, said switch means being operable at the ends of different time periods respectively.

6. In an electric testing apparatus, the combination with a circuit having a meter connected therein and adapted to be connected to the terminals of a battery to be tested, of a normally closed magnetic switch in said meter circuit, a normally open magnetic switch in said meter circuit, a main circuit adapted to be connected to said terminals and including a resistance and a normally open magnetic switch, a control circuit adapted to be connected to said terminals, including the windings of said normally open switches, a separate control circuit adapted to be connected to the battery terminals, including the winding of said normally closed switch, a switch means including a time actuated mechanism in each said control circuit operable at the end of a predetermined time period.

7. In an electric testing apparatus, the combination with a circuit having a meter connected therein and adapted to be connected to the terminals of a battery to be tested, of a main circuit including a resistance adapted to be connected to said terminals, a switch means including a time actuated mechanism for controlling said main circuit at the end of a predetermined time period, a solenoid, a circuit, including the winding for said solenoid, adapted to be connected to the battery terminals, a shutter arranged to be related to said meter to permit or prevent reading thereof and connected to and operated by the core of said solenoid, in the last mentioned circuit and including a time actuated mechanism operable to control said circuit at the end of a predetermined time period.

8. In an electric testing apparatus, the combination with a circuit having a meter connected therein and adapted to be connected to the terminals of a unit to be tested, of a circuit including a resistance adapted to be connected to the unit terminals, and a switch means including a time actuated mechanism for each of said circuits, the mechanism for said switch means for the meter circuit being operable at the end of a predetermined time period and the mechanism for the other circuit being operable at the end of a longer time period.

9. In an electric testing apparatus, the combination with a circuit having a meter connected therein and adapted to be connected to the terminals of a unit to be tested, of a lamp associated with said meter, a circuit for the lamp, a switch means for the lamp circuit having a time actuated mechanism operable at the end of a predetermined time period, and a separate circuit adapted to be connected to the unit terminals, the last mentioned circuit including a resistance and a switch means having a time actuated mechanism arranged to operate after the mechanism for the lamp circuit operates.

10. In an electric testing apparatus, the combination with a circuit having a meter connected therein and adapted to be connected to the terminals of a unit to be tested, of a lamp associated with said meter, a circuit for the lamp adapted to be connected to the unit terminals including a switch means having a time actuated mechanism operable at the end of a predetermined time period, and a separate circuit adapted to be connected to the unit terminals, the last mentioned circuit including a resistance and a switch means having a time actuated mechanism arranged to operate after the mechanism for the lamp circuit operates.

11. In an electrical testing apparatus, the combination with a circuit having a meter connected therein and adapted to be connected to a unit to be tested, of a switch in said meter circuit, a main circuit including a resistance, a switch for said main circuit, each said switch being normally disposed in one position, means for operating said switches to their other positions, respectively, and timed actuating mechanisms for controlling said means at the end of predetermined different time periods to restore said switches to their first positions, respectively.

12. An apparatus for conditioning and testing an electric unit comprising a circuit including a meter adapted to be connected to the unit, a separate circuit adapted to be connected to the unit for conditioning it for testing, means effective to prevent reading of said meter, said means including an electric circuit, switch mechanisms for said separate conditioning circuit and said last mentioned circuit, the switch mechanism for the last mentioned circuit having a timing mechanism effecting operation of the switch mechanism to permit reading of the meter at the end of a pre-determined period.

13. An apparatus for testing an electric unit which must be brought to a certain condition before test, comprising the following instrumentalities: a circuit including a meter or testing device, a separate circuit employed for bringing the tested unit into desired condition, means for making the reading of the meter impractical until the tested unit is put into requisite condition for the test, and electric switch mechanisms operating in sequence, first to cause the circuit that brings the unit into condition to be tested to operate and complete its conditioning operation, and second, and thereafter, to permit reading of the meter while the test is being made.

14. In a testing apparatus for an electric unit that must be brought to a certain condition before test, the combination, with a circuit having a meter included therein, adapted to be connected to the unit to be tested, of a separate circuit connected with the said unit and operating to bring it to the desired condition, a supplemental circuit, means controlled by the supplemental circuit arranged to interfere with the reading of the meter or to permit a reading of the same accordingly as it is operated, and a switch for controlling the supplemental circuit having a timed actuating mechanism arranged to cause operation of the said circuit at the end of a determined period, to permit reading of the meter.

15. The combination stated in claim 14 wherein the means controlled by the switch is an electric device.

EDWARD H. CAIN.